United States Patent
Chiu et al.

(10) Patent No.: US 8,144,224 B2
(45) Date of Patent: Mar. 27, 2012

(54) BINNING CIRCUIT AND METHOD FOR AN IMAGE SENSOR

(75) Inventors: Boh-Shun Chiu, Tainan (TW); Ping-Hung Yin, Tainan (TW)

(73) Assignee: Himax Imaging, Inc., Grand Cayman (KY)

(*) Notice: Subject to any disclaimer, the term of this patent is extended or adjusted under 35 U.S.C. 154(b) by 563 days.

(21) Appl. No.: 12/366,560

(22) Filed: Feb. 5, 2009

(65) Prior Publication Data

US 2010/0194944 A1    Aug. 5, 2010

(51) Int. Cl.
*H04N 3/14* (2006.01)
*H04N 5/335* (2011.01)

(52) U.S. Cl. .......................... 348/300; 348/294

(58) Field of Classification Search .......... 348/300–310, 348/294
See application file for complete search history.

(56) References Cited

U.S. PATENT DOCUMENTS

2008/0291310 A1* 11/2008 Ladd et al. .................... 348/308
2009/0322903 A1* 12/2009 Hashimoto et al. ......... 348/229.1

* cited by examiner

*Primary Examiner* — Joseph P Martinez
*Assistant Examiner* — Brandi Thomas
(74) *Attorney, Agent, or Firm* — Stout, Uxa, Buyan & Mullins, LLP

(57) ABSTRACT

A binning circuit and method for an image sensor is disclosed. A column amplifier (CA) is first reset, and thus generates a CA reset signal. A capacitor and a switch network are coupled between an output of the image sensor and an input of the column amplifier. A correlated double sampling (CDS) circuit controllably receives the output of the column amplifier. The switch network is controlled in a way such that an image signal of a first group of the image sensor is transmitted and stored in the CDS circuit, and an image signal of a second group is then added to the stored image signal of the first group.

5 Claims, 5 Drawing Sheets

BINNING CIRCUIT AND METHOD FOR AN IMAGE SENSOR

BACKGROUND OF THE INVENTION

1. Field of the Invention

The present invention generally relates to an image sensor, and more particularly to a binning circuit and method for a multiple-vertical-pixels-sharing image sensor.

2. Description of the Prior Art

Semiconductor based image sensors, such as charge-coupled devices (CCDs) or complementary metal-oxide-semiconductor (CMOS) sensors, are widely used, for example, in cameras or camcorders, to convert images of visible light into electronic signals that can then be stored, transmitted or displayed.

Some of the pixels (or photodiodes) in the image sensor can commonly share a circuit to reduce the overall size. The sharing structure may either be arranged in a vertical manner in which the pixels in the same column are sharing common circuitry, or in a horizontal manner in which the pixels in the same row are sharing common circuitry. FIG. 1 shows a conventional multiple-vertical-pixels-sharing image sensor 10, in which multiple groups (group A, group B, etc.) of pixels share common circuits respectively arranged in a vertical sharing manner.

As more pixels (or photodiodes) are manufactured in an image sensor, the area and thus the associated intensity of each pixel become smaller. Accordingly, the signals from two or more pixels are sometimes added up (commonly called "binning") to enhance the intensity so as to achieve better signal-to-noise ratio (SNR).

Nevertheless, binning signals across different sharing groups in a conventional vertical sharing image sensor become difficult without using additional circuitry. For example, in FIG. 1, binning inside the group A may be easily achieved by turning on associated transfer gates (tx_A_n, n=1, 2, etc.) at the same time. However, turning on the transfer gates (tx_A_n, tx_B_n, n=1, 2, etc.) from both the group A and the group B in the same (vertical) column at the same time will catastrophically result in signal collision between/among the outputs of the groups A and B at the column node (col). As a result, the conventional multiple-vertical-pixels-sharing image sensor disadvantageously has a limited number of signals to be binned.

For the reason that a conventional image sensor, such as the multiple-vertical-pixels-sharing image sensor shown in FIG. 1, could not effectively accommodate the signal binning, a need has thus arisen to propose a novel binning circuit and method for the image sensor, particularly a multiple-vertical-pixels-sharing image sensor, for binning signals across different sharing groups.

SUMMARY OF THE INVENTION

In view of the foregoing, it is an object of the present invention to provide a binning circuit and method for an image sensor, particularly a multiple-vertical-pixels-sharing image sensor, for effectively binning signals across different sharing groups.

According to one aspect of the present invention, a column amplifier (CA) is first reset, and thus generates a CA reset signal. A capacitor and a switch network are coupled between an output of the image sensor and an input of the column amplifier. A correlated double sampling (CDS) circuit controllably receives the output of the column amplifier. The switch network is controlled in a way such that an image signal of a first group of the image sensor is transmitted and stored in the CDS circuit, and an image signal of a second group is then added up to the stored image signal of the first group.

According to another aspect of the present invention, a column amplifier (CA) is first reset to generate a CA reset signal. A reset signal of a first group is received, followed by amplifying an image signal of the first group by the column amplifier and then storing the image signal of the first group. Subsequently, a reset signal of a second group is received, followed by amplifying an image signal of the second group by the column amplifier and then adding up the image signal of the second group to the stored image signal of the first group.

DETAILED DESCRIPTION OF THE INVENTION

Figure 1:
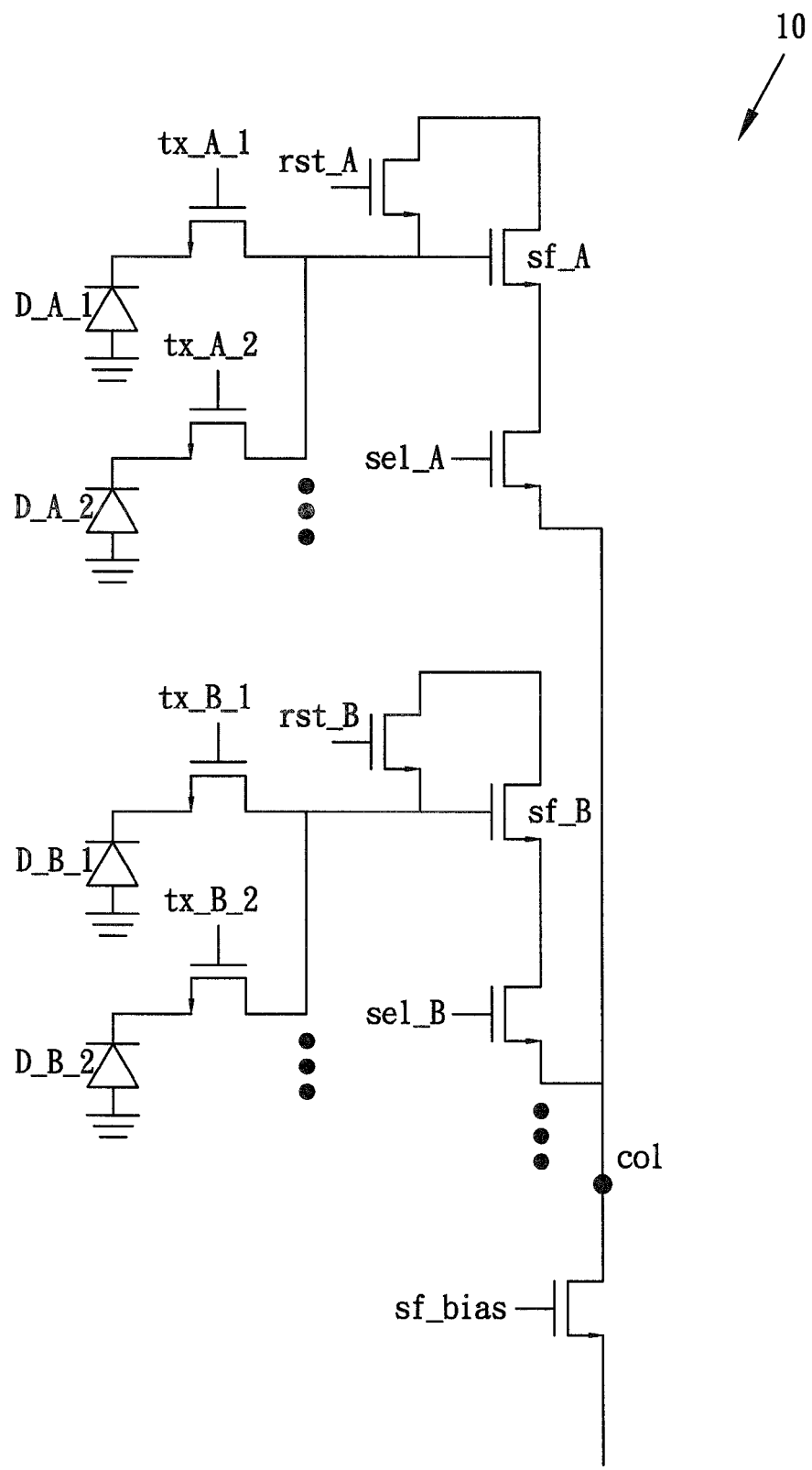
FIG. 1 shows a conventional multiple-vertical-pixels-sharing image sensor.
Figure 2:
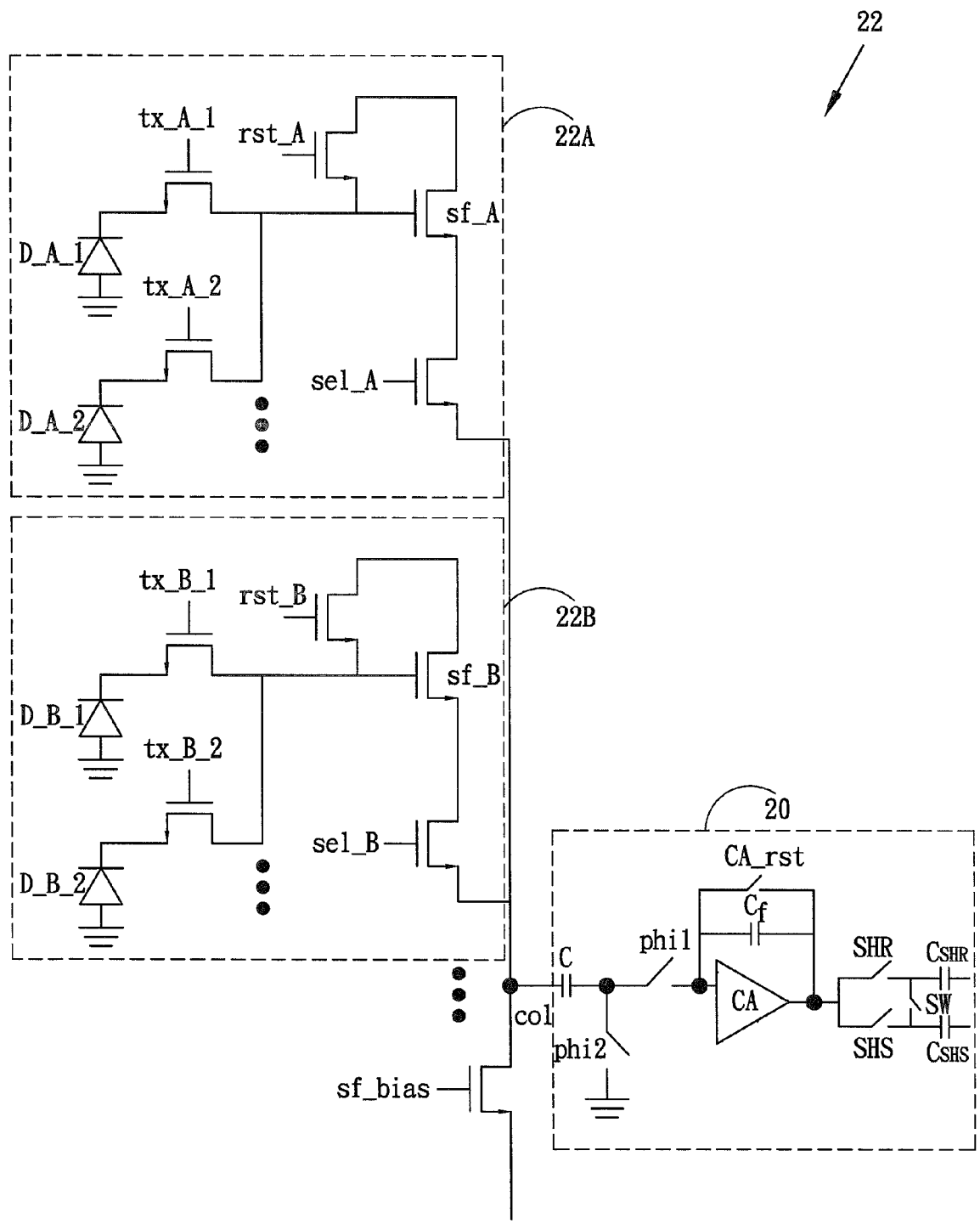
FIG. 2 shows a binning circuit for a multiple-vertical-pixels-sharing image sensor according to one embodiment of the present invention.

FIG. 2 shows a binning circuit 20 for a multiple-vertical-pixels-sharing image sensor 22 according to one embodiment of the present invention. The multiple-vertical-pixels-sharing image sensor 22 includes multiple groups, such as group A (22A) and group B (22B), and each group shares associated common circuitry arranged in a vertical sharing manner. The image sensor 22 may be, but is not limited to, a charge-coupled device (CCD) or complementary metal-oxide-semiconductor (CMOS) sensor for converting images of visible light into electronic signals. The output of the binning circuit 20 may be fed to an amplifier (not shown), such as a programmable gain amplifier (PGA). The disclosed image sensor 22 with the binning circuit 20 may be generally applied in a digital image processing device, such as, but not limited to, cameras or camcorders.

Specifically, taking the group A (22A) for example, each group of the image sensor 22 includes a reset transistor rst_A, a source follower transistor sf_A, a selector transistor sel_A, and a number of transfer transistors (tx_A_1, tx_A_2, etc.). In the figure, the transistors (or switches) and the associated control signals use the same reference characters. Specifically, the reset transistor rst_A, when it is turned on, is used to reset the photodiodes (D_A_1, D_A_2, etc.) to a reset reference voltage. The source follower transistor sel_A, when it is turned on, is used to buffer the image signals of the photodiodes (D_A_1, D_A_2, etc.). The selector transistor sel_A, when it is turned on by a word line, allows the readout of the pixel image signal. The transfer transistors (tx_A_1, tx_A_2, etc.), when they are turned on, are used to transfer the pixel image signals of the photodiodes (D_A_1, D_A_2, etc.) respectively. The reset transistor rst_A, the source follower transistor sf_A and the selector transistor sel_A are shared among the photodiodes (D_A_1, D_A_2, etc.). The outputs of the groups (A, B, etc.) are electrically coupled together at a column node (col).

The binning circuit 20 is utilized for effectively accommodating the signal binning across different groups (e.g., the group A, the group B, etc.). The binning circuit 20 is shared among the groups. The binning circuit 20 primarily includes a column amplifier CA. A feedback capacitor Cf is coupled between the output and the input of the column amplifier CA. A CA-reset switch CA_rst is also coupled between the output and the input of the column amplifier CA. The column node (col) is coupled to the input of the column amplifier CA via a capacitor C and a switch network. The switch network includes a first switch phi1 and a second switch phi2, where the capacitor is coupled to the column node (col) at a first plate, the first switch phi1 is connected between the input of the column amplifier CA and the second plate of the capacitor C, and the second switch phi2 is connected between the second plate of the capacitor C and the ground.

The binning circuit 20 further includes a correlated double sampling (CDS) circuit consisted of a sample-and-hold-reset_signal (SHR) switch and a sample-and-hold-image_signal (SHS) switch. The SHR switch and the SHS switch are coupled to a SHR capacitor $C_{SHR}$ and a SHS capacitor $C_{SHS}$ respectively. Specifically, when the SHR switch is closed, a reset signal will be sampled and held in the SHR capacitor $C_{SHR}$. When the SHS switch is closed, an image signal will be sampled and held in the SHS capacitor $C_{SHS}$. Further, the CDS circuit includes a switch SW, which is closed when the signals in the SHR $C_{SHR}$ capacitor and the SHS capacitor $C_{SHS}$ are forwarded to the following amplifier (for example, PGA) after the completion of the binning operation.

Figure 4:
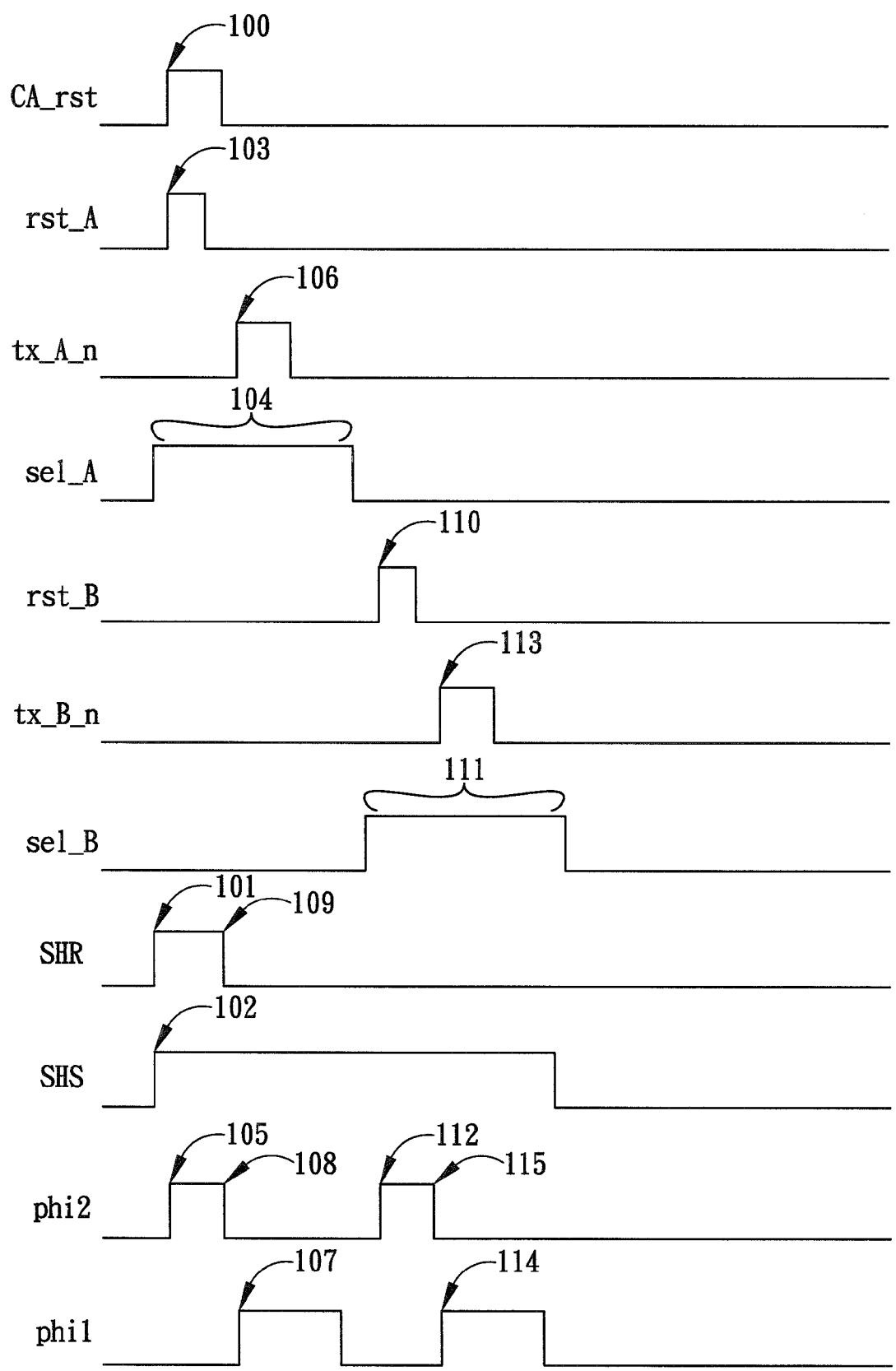
FIG. 4 shows a timing diagram of the corresponding signals in FIG. 2 and FIGS. 3A-3D.
Figure 5:
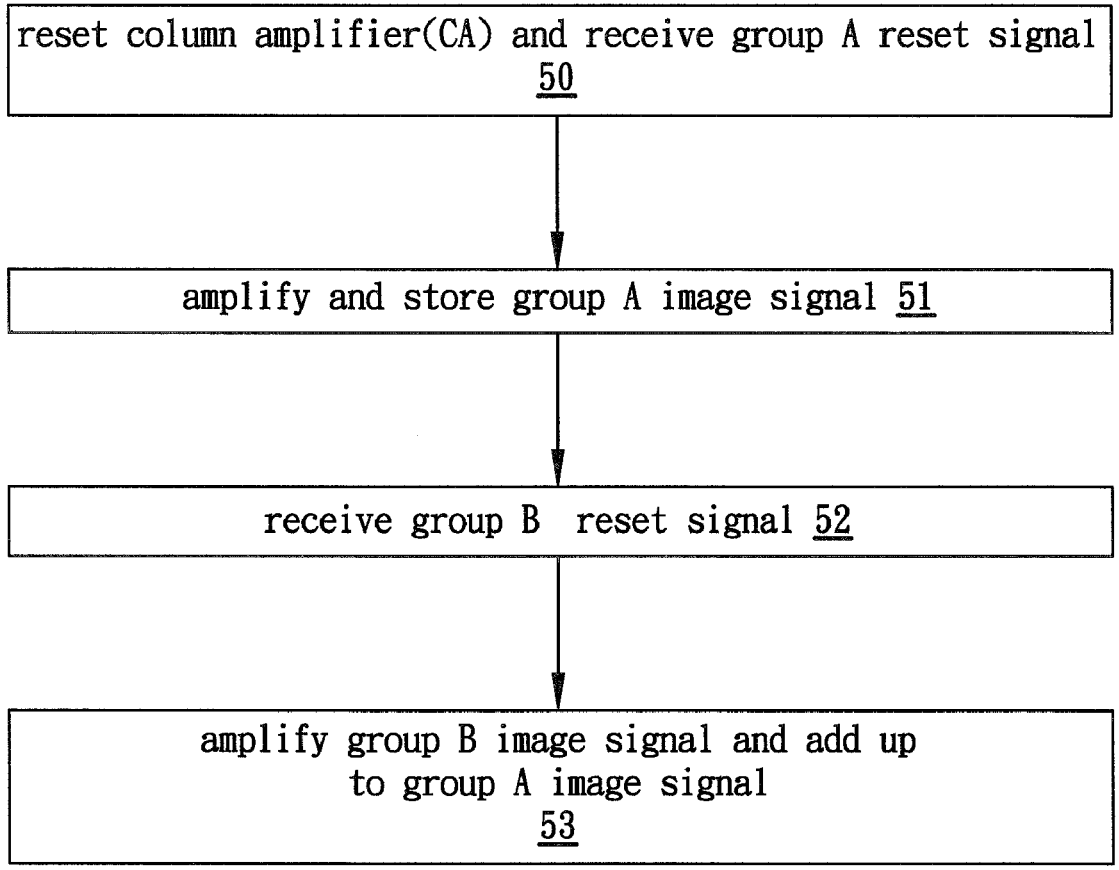
FIG. 5 is a flow diagram illustrating the steps of binning operation according to the embodiment of the present invention.

FIGS. 3A-3D show the equivalent circuits in sequence during the steps of the binning operation according to one embodiment of the present invention. FIG. 4 shows a timing diagram of the corresponding signals in FIG. 2 and FIGS. 3A-3D. FIG. 5 is a flow diagram illustrating the steps of binning operation according to the embodiment of the present invention. While the exemplary embodiment illustrates binning the signals of the group A and the group B, it is appreciated that the signals of other group or groups may be binned according to the present invention.

Figure 3A:
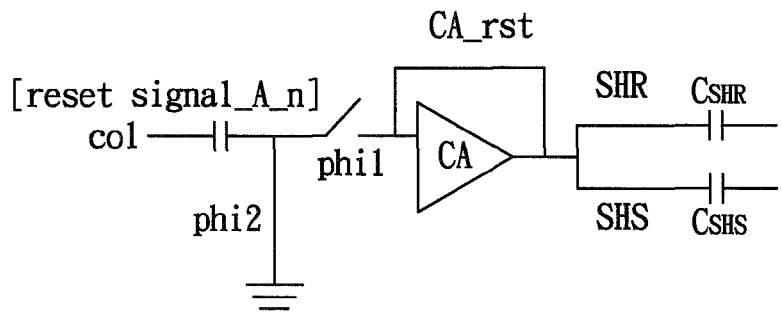
FIGS. 3A-3D show the equivalent circuits in sequence during the steps of the binning operation according to one embodiment of the present invention.

In the binning operation, first, the CA reset switch CA_rst is closed (100) to reset the column amplifier CA (the step 50) as shown in FIG. 3A. The SHR switch is closed (101) such that the CA reset signal is stored in the SHR capacitor $C_{SHR}$. In this phase, the SHS switch is also closed (102). The overlapping duration of the active SHR signal and the SHS signal is in practice arranged to prevent coupling effect. In an alternative embodiment, the SHS switch is open in this phase. At the same time, the (group A) reset transistor rst_A is turned on (103) with an asserted selector transistor sel_A (104). The output reset signal of the group A is then received and stored in the capacitor C (the step 50) by closing the second switch phi2 (105) (with the first switch phi1 open).

Figure 3B:
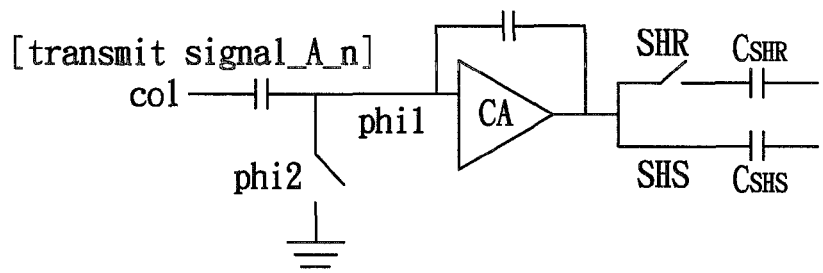

Subsequently, as shown in FIG. 3B, the transfer transistor tx_A_n (n=1, 2, etc.) of the group A is turned on (106) and the first switch phi1 is closed (107) but the second switch phi2 is open (108). Accordingly, the voltage at the input of the column amplifier CA is equal to the (group A) image signal minus the stored (group A) reset signal, and is then transmitted through and amplified by the column amplifier CA (the step 51) with the maintained closed SHS switch but open SHR switch (109). Accordingly, the image signal of the group A is thus stored in the SHS capacitor $C_{SHS}$.

Figure 3C:
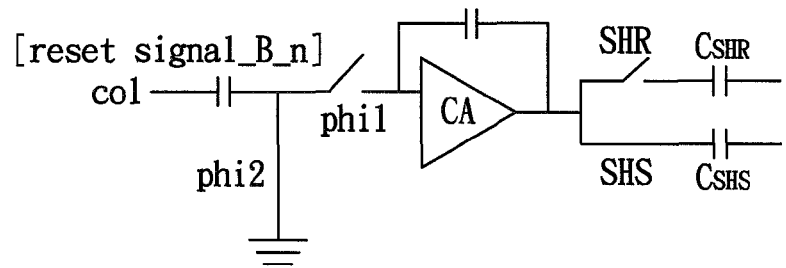

Afterwards, as shown in FIG. 3C, the (group B) reset transistor rst_B is turned on (110) with an asserted selector transistor sel_B (111). The output reset signal of the group B is then received and stored in the capacitor C (the step 52) by closing the second switch phi2 (112) (with the first switch phi1 open).

Figure 3D:
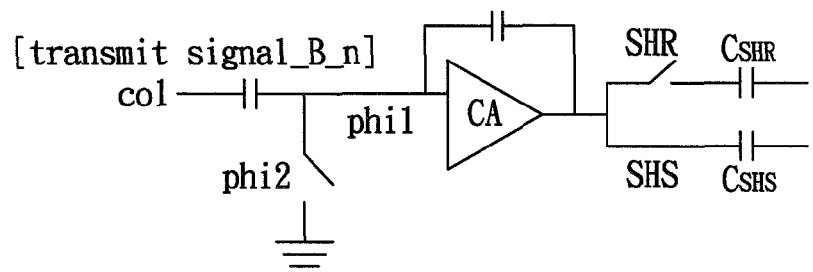

Subsequently, as shown in FIG. 3D, the transfer transistor tx_B_n (n=1, 2, etc.) of the group B is turned on (113) and the first switch phi1 is closed (114) but the second switch phi2 is open (115). Accordingly, the voltage at the input of the column amplifier CA is equal to the (group B) image signal minus the stored (group B) reset signal, and is then transmitted through and amplified by the column amplifier CA with the maintained closed SHS switch and open SHR switch. As the SHS switch has been maintained closed, the image signal of the group B is thus added (or binned) to the previous (group A) voltage stored at the SHS capacitor $C_{SHS}$ (the step 53), thus completing the signal binning operation.

According to the embodiment, signal binning across different sharing groups (such as A and B in the figure) in a multiple-pixels-sharing image sensor can be effectively and correctly performed without signal collision.

Although specific embodiments have been illustrated and described, it will be appreciated by those skilled in the art that various modifications may be made without departing from the scope of the present invention, which is intended to be limited solely by the appended claims.

What is claimed is:

1. A binning circuit for an image sensor, comprising:
   a column amplifier (CA), which generates a CA reset signal when the column amplifier is reset;
   a capacitor and a switch network coupled between an output of the image sensor and an input of the column amplifier; and
   a correlated double sampling (CDS) circuit controllably receiving the output of the column amplifier;
   wherein the switch network is controlled in a way such that an image signal of a first group of the image sensor is transmitted and stored in the CDS circuit, and an image signal of a second group is then added to the stored image signal of the first group;
   wherein the capacitor is coupled to the output of the image sensor at a first plate, and the switch network comprises:
   a first switch coupled between the input of the column amplifier and a second plate of the capacitor; and
   a second switch coupled between the second plate of the capacitor and ground.

2. The binning circuit of claim 1, wherein the image sensor is a multiple-vertical-pixels-sharing image sensor.

3. The binning circuit of claim 1, further comprising a feedback capacitor coupled between an output and the input of the column amplifier.

4. The binning circuit of claim 3, further comprising a CA reset switch coupled between the output and the input of the column amplifier.

5. The binning circuit of claim 1, wherein the CDS circuit comprises:
   a sample-and-hold-reset signal (SHR) switch for sampling the CA reset signal;
   a SHR capacitor coupled to the SHR switch for holding the CA reset signal;
   a sample-and-hold-image signal (SHS) switch for sampling the image signal of the image sensor; and
   a SHS capacitor coupled to the SHS switch for holding the image signal.

* * * * *